US005473999A

United States Patent [19]
Rawson et al.

[11] Patent Number: 5,473,999
[45] Date of Patent: Dec. 12, 1995

[54] ONE PASS SEEDBED PREPARATION DEVICE AND SYSTEM

[75] Inventors: Ray Rawson; Allen Rawson, both of Farwell, Mich.

[73] Assignee: Unverferth Manufacturing Co., Inc., Kalida, Ohio

[21] Appl. No.: 343,806

[22] Filed: Dec. 12, 1994

Related U.S. Application Data

[63] Continuation of Ser. No. 986,969, Dec. 8, 1992, abandoned.

[51] Int. Cl.$^6$ .............................. A01C 23/00; A01C 5/00
[52] U.S. Cl. ........................ 111/127; 111/140; 111/165; 111/186
[58] Field of Search ..................... 111/118, 120, 111/121, 127, 129, 165, 186, 187, 188, 166, 140, 139; 172/165, 166, 510, 579, 155, 156, 157, 158, 182, 201

[56] References Cited

U.S. PATENT DOCUMENTS

| | | |
|---|---|---|
| Re. 25,307 | 12/1962 | Johnston . |
| Re. 27,295 | 2/1972 | Pechacek . |
| T. 862,011 | 5/1969 | Koronka et al. ............ 111/140 X |
| 2,912,944 | 11/1959 | Snow et al. . |
| 3,588,139 | 6/1971 | Bayne . |
| 4,048,929 | 9/1977 | Zumbahlen . |
| 4,141,302 | 2/1979 | Morrison, Jr. et al. ............ 111/140 X |
| 4,285,284 | 8/1981 | van der Lely ............ 111/140 X |
| 4,381,823 | 5/1983 | Dietrich, Sr. ............ 172/155 |
| 4,430,952 | 2/1984 | Murray ............ 111/85 |
| 4,596,200 | 6/1986 | Gafford et al. ............ 111/140 X |
| 4,601,248 | 7/1986 | Beasley ............ 111/140 |
| 4,785,890 | 11/1988 | Martin ............ 172/29 |
| 4,947,770 | 8/1990 | Johnston ............ 111/121 |
| 4,987,841 | 1/1991 | Rawson et al. . |
| 4,998,488 | 3/1991 | Hansson ............ 111/121 X |
| 5,133,414 | 7/1992 | Youngkrantz ............ 172/510 |
| 5,152,349 | 10/1992 | Roden ............ 111/139 X |
| 5,271,342 | 12/1993 | Neidhardt ............ 111/119 |

OTHER PUBLICATIONS

Yetter, Yetter Manufacturing Co., Colchester, Ill., dated Jun. 1989, pp. 5 and 17.
COPY—one sheet—p. 42—dated Feb. 1989 of the Farm Industry News vol. 22, No. 2.
COPY—2 sheets from United Farm Tools, Inc. and entitled No-Till Grain Planter Drill.
COPY—2 sheets of the Great Plains New Product Bulletin entitled Coulter Caddy.
COPY—2 sheets of the Great Plains New Product Bulletin entitled Coulter Caddy.
COPY—4 pages from the Tye No Tills (printed Jul. 1982).

*Primary Examiner*—Clifford D. Crowder
*Assistant Examiner*—Paul C. Lewis
*Attorney, Agent, or Firm*—Henderson & Sturm

[57] ABSTRACT

A coulter blade assembly for use with a farm implement, which assembly comprises a first coulter unit, a second coulter unit, and a third coulter unit, all units mounted to the implement in a triangular arrangement in plan; with the first coulter unit being a lead unit, the second coulter unit trailing and to one side of the lead unit, and the third coulter unit trailing and placed to an opposite side of the second coulter unit for forming with said other coulter units a seedbed, and a substance applicator mounted on the third coulter unit for applying the substance onto the seedbed, and optionally a second substance applicator mounted on the second coulter unit for applying another substance onto the seedbed separated laterally from the other substances. The invention includes further a process of preparing a seedbed by moving and rotating implements such as coulter blades into the ground in a particular triangular relationship in conjunction with one or more substance applications concurrently therewith.

18 Claims, 2 Drawing Sheets ns.5,473,999

ONE PASS SEEDBED PREPARATION DEVICE AND SYSTEM

This is a continuation of application Ser. No. 07/986,969 filed on Dec. 8, 1992, now abandoned.

TECHNICAL FIELD

The present invention relates generally to tillage equipment, and more particularly to a coulter blade assembly, and further relates to a one-pass seedbed preparation for planting.

BACKGROUND ART

Numerous methods and apparatus are involved in an ever expanding field, if not science of tillage, the preparation of the soil for seed planting purposes. Today, farmers use and experiment with ridge-tilling, no-tilling, and now are beginning to work with conservation tillage farm equipment and methods. It is the latter to which this invention is directed.

Historically, farmers have relied upon conventional or "deep" tilling to prepare their fields for planting; utilizing a moldboard plow, chisel plow or other cultivating implement which is dragged over the fields after harvest of a prior crop to break up the soil to a substantial depth, to cut and bury the residue of the harvest, and to bring deep soil up to the surface. Several passes of additional implements are required over the same soil prior to planting to facilitate same. Recently the concept of conservation tillage has emerged utilizing the planter as a primary implement to support blade assemblies used to open a furrow of predetermined depth, to deposit seeds within the furrow, and then to close the furrow over the seeds, all in a single or one-pass.

Conservation or no-till planting appeared to reduce the number of tillage trips over the same field; however, the problem of dealing with the residual mulch has been left somewhat unsolved. Residual mulch is that residue of live and dead vegetation and plant stubble left in place by this type planting after harvest. There are benefits such as aiding in the control of erosion, and of fertilization through decomposition; along with disadvantages such as retarding evaporation to leave soil at unacceptably high levels of moisture content. Additional problems of fertilizer application and timing relative to the seedbed preparation increased the considerations of management as to the more contemporary conservation planting.

Reference is made to our prior invention showing a pair of mirrored coulters in U.S. Pat. No. 4,987,841. This arrangement provided an important advance in this field of conservation tillage, however the instant disclosure shows advantages thereover.

DISCLOSURE OF THE INVENTION

The present invention comprises a trio of coulters mounted in a predetermined triangular pattern on a tool bar in front of the planter, with at least one fertilizer applicator trailing or to one side of either the second and third coulters such that a strip of soil having a width depending on the lateral spacing of the second and third coulters is tilled in the soil leaving otherwise undisturbed residue.

The lead coulter, placed laterally intermediate the second and third coulters, placed slightly deeper, provides a good seed slot and a place for roots to grow. Thus the coulter assembly prepares a well aerated seedbed with one pass of the planter across a field containing residue of prior plantings.

Attachment of the assembly to an existing seed planting apparatus is accomplished by mounting brackets ensuring that two coulters will be longitudinally offset from each other for maximum efficiency, with the third positioned between the offset coulters. The mounting brackets allow coulter assembly attachment to the front, back, or underside of the front bar of an existing seed planting apparatus to provide a wide variety of placement options for the operator. Preferably, one is attached in front of the bar, one behind the bar and the third between them. This provides a longitudinally offset arrangement for all of the coulters.

Alternatively, the three coulters may be mounted on a pair of longitudinally spaced front and rear bars of a planter, but in the same relationship. Further, where very heavy residue exists, it has been found that an even more effective use of this coulter arrangement can be obtained with enhanced action of the lead coulter unit by inclining slightly the second and third coulters toward each other in the direction of travel; and where the mounting of three coulter units is difficult, utilizing only the second and third coulter units in the inclined, converging arrangement provides improved tillage. This arrangement may be used in conjunction with a row cleaner or other device attached to or in front of the row unit. A liquid or dry fertilizer applicator may or may not be used, and if not, the use of the original equipment manufacturer's fertilizer opener may be enabled.

A liquid fertilizer delivery tube is attached to the apparatus behind the coulter by spring means which prevent soil and residue from clogging up in the fertilizer delivery tube area and thereby affecting the operation of the apparatus. Additionally, a dry fertilizer delivery tube may be placed next to the second coulter, mixing it into the soil near the row.

With the apparatus of the present invention, the operator is provided with various adjustments in the placement of the apparatus in relation to the preexisting equipment and also in relation to the ground to be prepared for planting.

In accordance with the foregoing, it is an object of the present invention to provide a farmer or gardener with a seedbed preparation apparatus which:

(1) easily attaches to existing planting equipment;
(2) is attachable to existing equipment in a variety of locations thereon;
(3) is adjustable for depth of cultivation;
(4) may be adjustably biased towards the ground;
(5) provides a fertilizer delivery means positionable on the seedbed preparation apparatus capable of holding a variety of fertilizer delivery systems;
(6) is a highly efficient, minimal maintenance seedbed preparation apparatus capable of operating in a field containing residue of prior plantings; and
(7) is capable if seedbed preparations with one pass over the ground.

Other objects, advantages, and salient features of the present invention will become apparent from the following detailed description, which when taken in conjunction with the annexed drawings, discloses a preferred embodiment and process of application of the present invention.

BRIEF DESCRIPTION OF THE DRAWINGS

These and other attributes of the invention will become more clear upon making a thorough review and study of the following description of a preferred embodiment, particularly when reviewed in conjunction with the drawings, wherein.

BEST MODE FOR CARRYING OUT THE INVENTION

Figure 1:
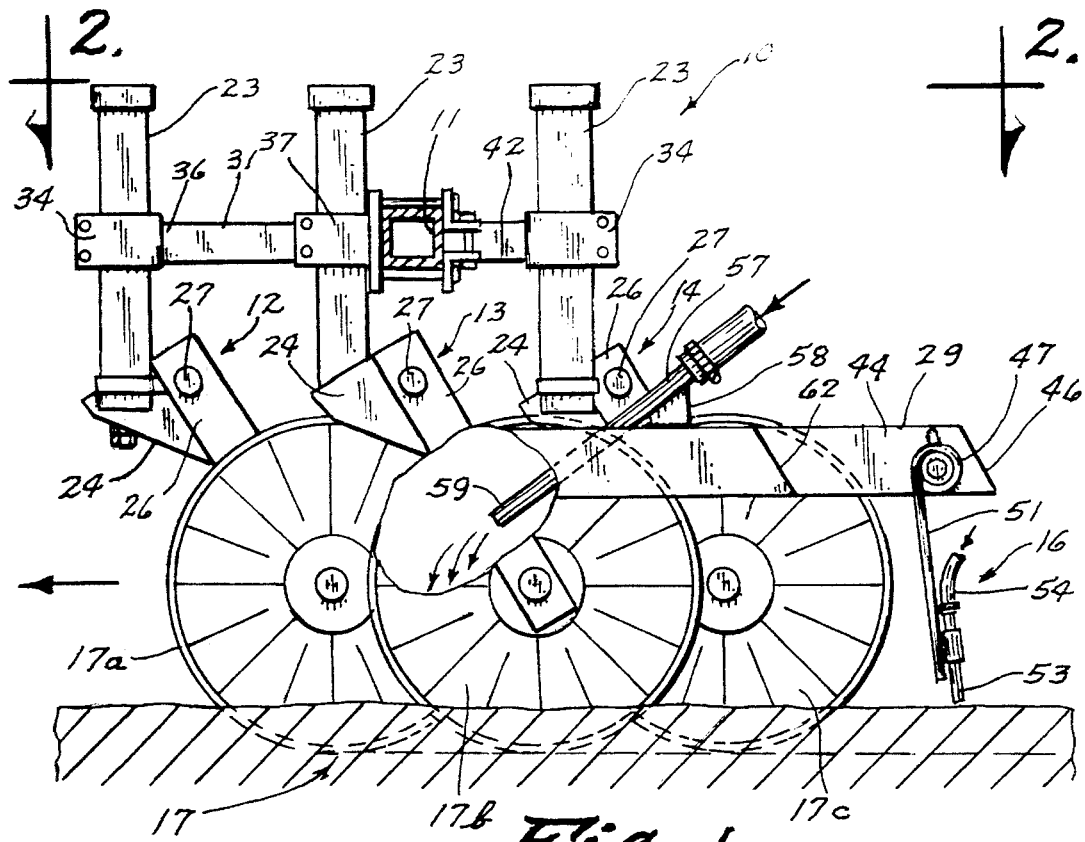
FIG. 1 is a side elevational view of the coulter assembly of this invention as mounted on a conventional planter assembly.

Referring now to the drawings in which the same reference numerals designate the same elements throughout the several views, FIG. 1 shows in side elevational view the coulter assembly of this invention indicated generally at (10). The coulter assembly (10) is detachably mounted on a transverse tool bar (11) of a conventional planter (not shown) as is shown in U.S. Pat. Nos. 4,430,952 and 4,785,890, so as to be located in front of the planter unit mechanisms, for the purpose of preparing a seedbed for conventional use of the planter unit. Thus the planter tool bar (11) does not form a part of this invention, other than to provide a means for attachment of the coulter assembly (10) to a conventional planter.

Figure 2:
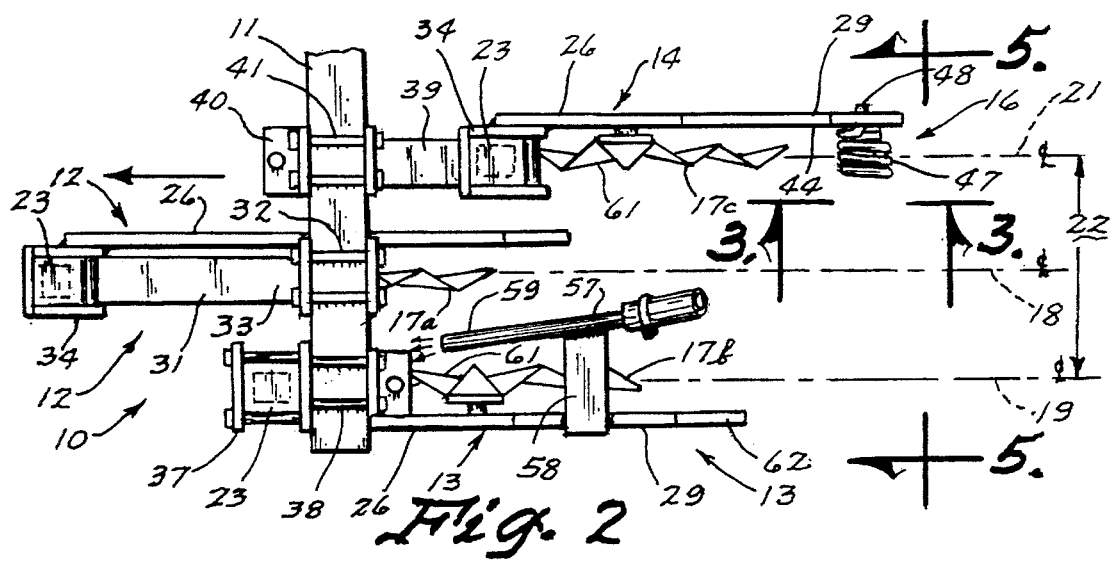
FIG. 2 is a plan view of the coulter assembly of FIG. 1, with centerlines shown for the coulters according to the relative placement of same, and setting up a path or zone of seedbed preparation.

The assembly (10) via the tool bar (11) is adapted to be attached to a prime mover such as a tractor to be towed across the ground at a predetermined speed, and in a direction as indicated by the arrows in FIGS. 1 and 2.

The coulter assembly (10) comprises a first or lead coulter unit (12) (FIGS. 1 and 2) secured to the tool bar (11), a second or intermediate coulter unit (13) secured to the tool bar (11) rearwardly and to one side of the lead coulter unit (12), a third or trailing coulter unit (14) secured to the tool bar (11) rearwardly of the second coulter unit (13) and to an opposite side of the lead coulter unit (12), and a fertilizer applicator unit (16) mounted on the trailing coulter unit (14). Upon forward movement of the planter tool bar (11) as indicated by the arrow in FIG. 2, and as described in detail hereinafter, each coulter unit (12), (13) and (14) is caused to be operated by the engagement of a coulter (17) of each unit with the soil, to rotate each coulter (17) for clearing residue and loosening the soil in first, second and third paths, indicated respectively by centerlines (18), (19) and (21) (FIG. 2), along with moving the fertilizer applicator in tandem with the trailing coulter unit (14) and causing, by conventional fertilizer equipment (not shown) mounted in conjunction with the planter unit, generally either a dry or a wet fertilizer to be applied onto the soil within the transverse zone (22) formed between the outermost paths (19) and (21). We indicate this process by the term "zone-tillage."

Each coulter unit (12), (13) and (14) is identical and comprises an elongated post (23), a bracket (24) secured at the base of the post (23), an arm (26) pivotally secured at (27) to the bracket (24) and extended rearwardly and downwardly therefrom, a coulter (17) rotatably mounted to the lower end (28) of the arm (26), and an elongated support (29) secured at its front end to the arm (26) and extended in the same plane therewith.

As best shown in FIGS. 1 and 2, each coulter unit (12), (13) and (14) is mounted to the tool bar (11) with the posts (23) in an upright manner, and with the coulters (17) and supports (29) disposed within a vertical plane extended parallel in the plan to the longitudinal axis of the coulter assembly (10), and also with the longitudinal axis of each coulter unit normal to the transverse extent of the planter tool bar (11). Further, referring to FIG. 2, it will be noted the outermost coulter units (13) and (14) are arranged asymmetrically on either side of the lead coulter unit (12) as explained in detail, although longitudinally offset.

To accomplish such mounting, the lead coulter unit (12) is provided with an extension element (31) (FIGS. 1 and 2) mounted by fasteners (33) at its rear end (33) to the tool bar (11) and with a clamp device (34) of its forward end (36) for receiving and holding the unit (12) post (23) forwardly of the tool bar (11); the second coulter unit (13) has its post (23) mounted by a clamp device (37) and fasteners (38) directly to and in front of the tool bar (11); and the trailing coulter unit (14) has an extension element (39) somewhat shorter than element (31) fastened by a clamp device (40) and fasteners (41) to the tool bar (11), with the rear end (42) of the extension rearwardly of the tool bar (11) and having a clamp device (34) for receiving and holding the post (23) of the rear, trailing coulter unit (14). Each post (23) is vertically adjustably clamped to place the coulters (17) at a predetermined depth in the soil for tillage purposes; the coulter (17a) of the lead unit (12) could be placed slightly lower than the other two coulters (17b and 17c).

Further, it will readily be noted that due to the fastening arrangements, each coulter unit (12), (13) and (14) may be adjustably located transversely on the tool bar (11) and relative to each other. It will be noted further that all three coulter units (12), (13) and (14) are mounted on a single tool bar (11) thus the strength of that tool bar (11) must be capable of supporting same; however, the use of a pair of parallel, fore and aft tool bars as a part of the same planter frame is envisioned, with the mountings changed but with the coulter units (12), (13) and (14) in the same relative arrangement. This same relative arrangement may also be mounted on multiple tool bars as well as planter frames.

The coulters (17a, 17b and 17c) are identical as to type, being wavy or fluted, although their surface irregularity may vary depending upon soil conditions. The lead coulter (17a) may be a one inch fluted coulter blade, with the second and third coulters (17b and 17c) being each a two inch fluted coulter blade. Each coulter (17) is preferably 17¼" or 20" in diameter, although optional sizes are available. All three coulters (17a, 17b and 17c) are spring-biased toward the soil in a conventional manner with heavy duty springs (not shown) mounted within the posts (23) and loaded with adjustable pressure of 0 to 2200 pounds, thus providing excellent constant penetration and cutting under hard conditions. This spring biased structure is described in our previous U.S. Pat. No. 4,987,841. Each coulter (17) is rotatable about a normally horizontal axis substantially normal to the direction of travel of the coulter assembly (10) and tool bar (11).

The trio of coulter units (12), (13) and (14) till preferably, a strip (22) eight or nine inches wide as determined between the outermost centerlines or paths (19) and (21) (FIG. 5) in otherwise undisturbed soil, whereby soil in the strip (22) warms up faster, with seed-to-soil contact improved. Due to the residue cover remaining over the soil from previous harvesting, moisture is within the soil such that upon tilling with this coulter assembly (10), warm air is pumped into the soil. The lead coulter unit (12), placed midway between the two following coulter units (13), (14) provides a place for roots to grow, particularly if there was some compaction. Further, the lead unit (12) replaces the conventional seed planter (not shown) conservation coulters.

Figure 3:
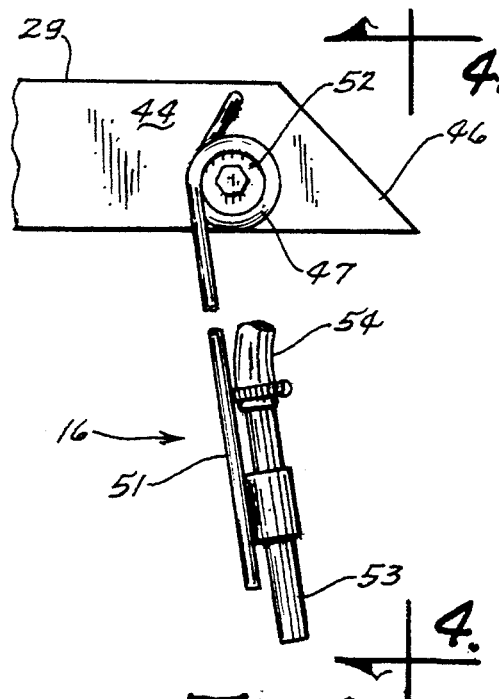
FIG. 3 is an enlarged side elevational view of a liquid fertilizer applicator taken along the line 3—3 in FIG. 2.
Figure 4:
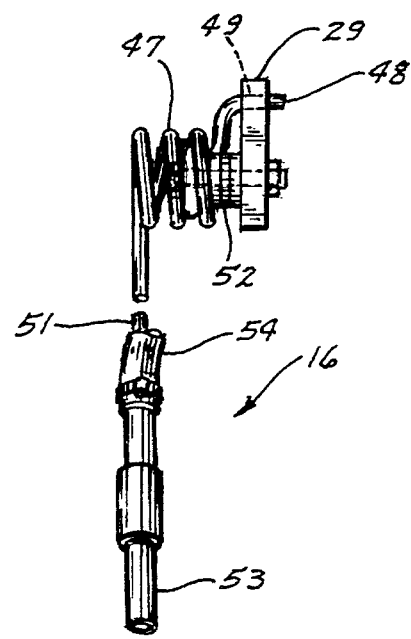
FIG. 4 is a view taken along the line 4—4 in FIG. 3.

To apply a seed growth enhancement substance onto the strip (22), the liquid applicator unit (16) (FIGS. 1 and 2) is mounted on the inside surface (44) of the rear end (46) of the support (29) for the trailing coulter unit (14). The applicator unit (16) comprises a coil spring (47) leaving one end (48) (FIGS. 3 and 4) inserted through a hole (49) formed in the support end (46), with the other end (51) depended toward the ground and with the coil spring (47) resiliently held in place adjacent the support end (46) by a fastening device (52). In this manner, the lower end (51) may flex and move in all directions from its original position, if struck by clods, hard residue, dirt or the like, always returning to its original position. A standard, liquid fertilizer nozzle (53) is secured to the lower end (51), as by welding or the like, and fertilizer is supplied to the nozzle (53) through a tube (54) in a conventional manner. The nozzle (53) utilized herein has a top which creates a straight stream of fluid as it leaves the nozzle. The resilience of the coil spring (47) thereby allows for grounded elevation changes and allows the injector nozzle (53) to be retained at a proper distance from the ground at all times; for example, at or just below the soil surface.

Dry fertilizer is also applied to the seedbed (56) (FIG. 5) formed by the operation of the coulter assembly (10) by an elongated tubular member (57) (FIGS. 1 and 2), mounted by a bracket (58) to the support (29) of the second coulter unit (13) and with its lower discharge end (59) directed toward the inside surface (61) of the second unit coulter (17b). Again, the dry fertilizer applicator member (57) is supplied through the tube (57) by conventional equipment mounted on the planter unit similar to the liquid fertilizer arrangement.

In an alternative arrangement, the dry applicator (57) may be replaced with the liquid fertilizer applicator unit (16) mounted on the rear end (62) of the second coulter unit (13) support (29) in the same manner as described with respect to the trailing coulter unit (12), and here it has been found that additional residue clearance has been provided.

In one specific embodiment, with the coulters (17) approximately six inches longitudinally offset, and with the lead coulter (17a) substantially intermediate the second and third coulters (17b, 17c), the second coulter (17b) is placed approximately three and one-half inches off center (the seed placement) of the strip (22) (FIG. 5), and the trailing coulter (17c) is positioned approximately four to six inches off center (18) on the opposite side of the second coulter (17b). The second and third coulters (17b and 17c) are placed facing each other in a mirror relationship. This arrangement keeps the coulters (17) from plugging with residue, one cleaning the other. Further, with the dry fertilizer tube (57) directed toward the fluted surface of the second coulter, the fertilizer is diffused and mixes better with and into the soil, thus being placed closer to the seed.

Figure 5:
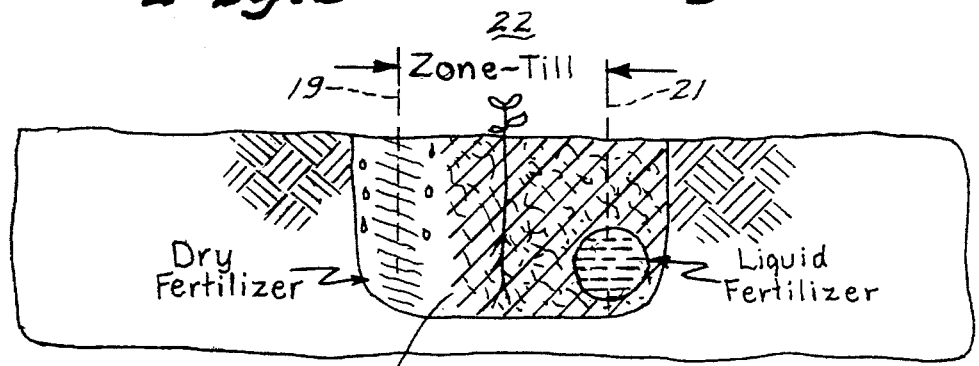
FIG. 5 is a pictorial view as taken across and within the soil of the path shown by the centerlines of FIG. 2, and showing the specific placement of liquid and dry fertilizer by the coulter assembly within the seedbed by the one-pass system.

Referring to FIG. 5, it will be seen that the process of (a) moving the lead coulter assembly (12) and causing rotation of the lead coulter (17a) as it moves into engagement with the soil in a first path (18); (b) moving the second coulter assembly (13) simultaneously and causing rotation of the second coulter (17b) as it moves into engagement with the soil in a second path (19); moving the trailing coulter assembly (14) simultaneously and causing rotation of the third coulter (17c) as it moves into engagement with the soil in a third path (21) whereby a seedbed (56) is prepared within a defined lateral strip (22) of soil; and simultaneously applying a seed growth enhancing substance into one side of the seedbed provides an improved seedbed preparation, which when combined with the seed planter to which the coulter assembly is attached, provides further a one-pass planting system.

The system is enhanced by the provision of the dry fertilizer applicator (57–59) which can place the dry fertilizer on an opposite side of the seedbed (56) as the liquid fertilizer, thus providing improved row support fertilizer with precision placement of the fertilizer.

Figure 6:
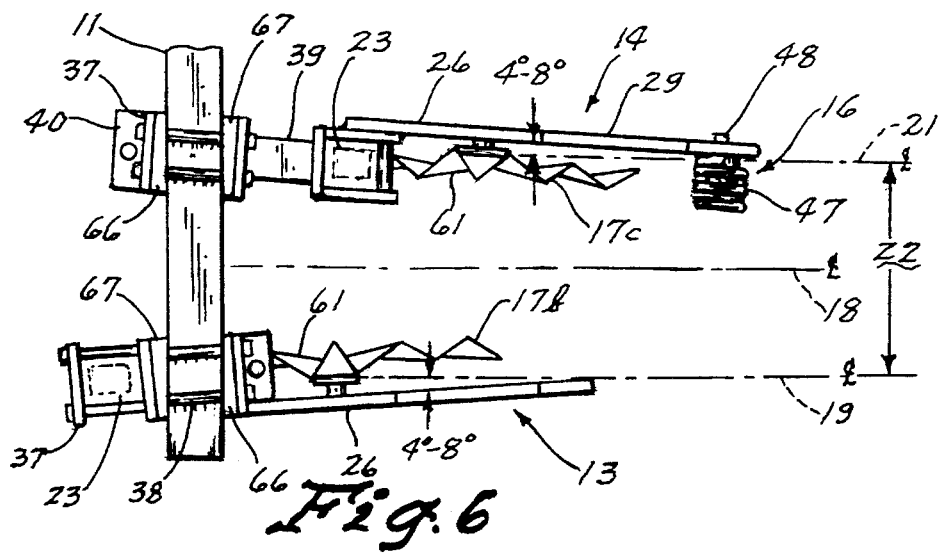
FIG. 6 is a plan view similar to FIG. 2, and showing a two coulter unit arrangement.

Referring to FIG. 6, the second coulter unit (13) and the third coulter unit (14) are mounted as by shims (66), (67) inserted between the respective clamp devices (37) and (40) and the tool bar (11), whereby to place each coulter unit (13) and (14) at an inclination in plan of from two to eight degrees (2°–8°) from the direction of travel and off their respective centerlines (19) and (21), and toward the centerline (18).

Although the use of shims (66), (67) is shown, numerous other mounting arrangements for inclining the coulters (17b) and (17c) from either the tool bar (11) or from their posts (23) are readily envisaged. Thus, the longitudinal extents of the second and third coulter units (13) and (14) as shown in FIG. 6 are converging toward each other in the direction of travel of the coulter assembly (10). This two coulter, inclined arrangement has proved effective for zone tillage purposes particularly where the mounting of a three coulter arrangement is difficult due to space requirements.

Where a particularly aggressive tillage is necessary for preparing a seedbed in heavy residue, the second and third coulter units (13) and (14) of the FIG. 2 arrangement are mounted at inclined angles to the tool bar (11) and to the centerline (18) as shown in FIG. 6, as by shims (66), (67) or the like to thereby place the inclined coulters (17b), (17c) in combination with the straight or longitudinally centered and aligned lead coulter (17a).

We claim:

1. A coulter blade assembly for use with a farm implement, comprising in combination:

first means adapted to be mounted on the implement and rotatably engageable with the ground for clearing residue and loosening the soil in a first path determined by movement of the implement across the ground;

second means adapted to be mounted on the implement to one side of and trailing said first means relative to a forward movement of the implement, said second means rotatably engageable with the ground for clearing residue and loosening the soil in a second path determined by movement of the implement across the ground;

third means adapted to be mounted on the implement to a side of said first means opposite said second means and trailing said second means relative to a forward movement of the implement, said third means rotatably engageable with the ground for clearing residue and loosening the soil in a third path determined by movement of the implement across the ground, said second and third means operable together to form a seedbed between said second and third paths; and fourth means mounted on said third means in a trailing relationship therewith for applying a seed growth enhancing substance onto the soil between said second and third paths.

2. The coulter blade assembly of claim 1, and wherein said first, second and third means each includes a circular blade biased toward the ground and rotatable about a normally horizontal axis substantially normal to the direction of travel of the implement.

3. The coulter blade assembly of claim 2, and wherein said second and third means blades are arranged facing each other in at least a partial mirror image relationship to one another.

4. The coulter blade assembly of claim 3, and further wherein said second and third means blades are each inclined toward the other at an acute angle in plan relative to the direction of travel of the coulter blade assembly.

5. The coulter blade assembly of claim 1, and wherein within said second and third paths a seedbed is prepared, with said fourth means located to place said substance to one side of a centerline of said seedbed longitudinal of the implement direction of travel across the ground.

6. The coulter blade assembly of claim 5, and wherein a fifth means is mounted on said second means for applying a seed growth enhancing substance onto the soil to one side of said second means.

7. The coulter blade assembly of claim 6, and wherein said fifth means includes a tubular element for applying said substance directly against an inside of said second means blade for diffused application onto the soil.

8. The coulter blade assembly of claim 7, and wherein said fifth means is located to place its said substance onto the soil on a side of said centerline of said seedbed opposite the side thereof on which said diffused substance is placed, wherein space is left between said two substances within the lateral confines of said seedbed to place seed within said space and centrally of said two substances for enhanced growth.

9. A seedbed preparation apparatus for use with a planter adapted to be towed by a prime mover, the planter having a frame including a horizontally disposed member and disposed normal to the direction of movement of the planter;

a first coulter wheel assembly, a second coulter wheel assembly and a third coulter wheel assembly, each said assembly adapted to be adjustably secured to the planter frame member by means for mounting said assemblies;

said first coulter wheel assembly being furthest towards the front relative to said second and third coulter wheel assemblies, said first coulter wheel assembly being located laterally between said second and third coulter wheel assemblies;

said second coulter wheel assembly mounted laterally offset from said first coulter wheel assembly;

said third coulter wheel assembly being furthest towards the rear of said frame in a trailing position behind said second coulter wheel assembly, said third coulter wheel assembly partially facing in at least a partial a mirror image relationship and laterally offset from said second coulter wheel assembly, said second and third coulter wheel assemblies thereby operable to form a seedbed therebetween; and means mounted on said third coulter wheel assembly for applying fertilizer behind said third coulter wheel assembly and onto the seedbed.

10. The apparatus of claim 9, wherein each said coulter wheel assembly comprises a post member adapted to be attachable to the frame member, a coulter wheel, a wheel arm secured to said post for supporting said coulter wheel, and a support beam extended rearwardly of said post.

11. The apparatus of claim 10, wherein:

said fertilizer application means comprises a spring member having a head portion secured to a rearward portion of said support beam and an end portion, and a fluid applicator nozzle secured to said end portion.

12. The apparatus of claim 9, and further wherein said first coulter wheel assembly and said second coulter wheel assembly are disposed fore and aft of the frame member and laterally of each other producing a longitudinal and lateral offset of said first and second assemblies.

13. A process of preparing a seedbed having a predetermined width within soil covered by residue from previous plantings, comprising the steps of:

(a) moving and rotating a first implement into engagement with the soil in a first path;

(b) simultaneously moving and rotating a second implement into engagement with the soil in a second path laterally to one side of said first path relative to the direction of movement of said implements;

(c) simultaneously moving and rotating a third implement into engagement with the soil in a third path laterally to an opposite side of said first path thereby forming a seedbed between said second and third paths;

(d) simultaneously moving a first substance applicator in tandem with said third implement; and (e) applying substance from said first applicator onto the seedbed.

14. The process of claim 13, and further comprising the step of moving a second substance applicator in tandem with said second implement and applying fertilizer from said second applicator onto the seedbed.

15. The process of claim 14, and further applying substance from said first applicator to one side of said seedbed and applying substance from said second applicator to an opposite side of the seedbed.

16. The process of claim 15, and further directing the substance from said second substance applicator against said second implement as the latter rotates for diffused application onto the seedbed.

17. An apparatus for tilling and fertilizing the soil comprising:

a frame for movement in a predetermined direction;

a blade rotatably mounted on said frame for rotation within a generally vertical plane, and upon movement of said frame, rotatable upon engagement with the soil about a generally horizontal axis substantially normal to the direction of movement of said frame, said blade having an irregular surface; and means for directing a seed growth enhancing substance against said irregular surface prior to said substance falling onto the soil to one side of said blade.

18. A coulter blade assembly for use with a farm implement comprising in combination:

a first means adapted to be mounted on the implement and having a fluted, circular blade biased toward the ground and rotatable about a normally horizontal axis, said blade in plan inclined slightly off the centerline of the coulter blade assembly, which centerline is normally aligned with the direction of travel of the coulter blade assembly; and a second means adapted to be mounted on the implement and having a fluted, circular blade biased toward the ground and rotatable about a normally horizontal axis, said blade in plan inclined slightly off the centerline of the coulter blade assembly, which centerline is normally aligned with the direction of travel of the coulter blade assembly, said second blade adapted to be mounted to one side of and in a trailing relationship with said first blade, and wherein portions of said first and second blades face each other in at least a partial mirror image relationship to each other;

and further wherein said blades of said first means and said second means are inclined toward each other in plan such as to have a converging relationship with each other relative to the direction of travel of the coulter blade assembly.

* * * * *